United States Patent
Ebara et al.

(10) Patent No.: US 11,550,488 B2
(45) Date of Patent: Jan. 10, 2023

(54) COMPUTER SYSTEM AND LOAD DISTRIBUTION METHOD

(71) Applicant: Hitachi, Ltd., Tokyo (JP)

(72) Inventors: Hiroto Ebara, Tokyo (JP); Yoshinori Ohira, Tokyo (JP); Takaki Nakamura, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/187,071

(22) Filed: Feb. 26, 2021

(65) Prior Publication Data
US 2022/0107747 A1    Apr. 7, 2022

(30) Foreign Application Priority Data

Oct. 7, 2020 (JP) .............................. JP2020-169812

(51) Int. Cl.
*G06F 12/00* (2006.01)
*G06F 3/06* (2006.01)
*G06F 12/10* (2016.01)

(52) U.S. Cl.
CPC ............ *G06F 3/0647* (2013.01); *G06F 3/067* (2013.01); *G06F 3/0611* (2013.01); *G06F 3/0644* (2013.01); *G06F 12/10* (2013.01); *G06F 2212/1024* (2013.01)

(58) Field of Classification Search
CPC .... G06F 3/0647; G06F 3/0611; G06F 3/0644; G06F 3/067; G06F 12/10; G06F 2212/1024
See application file for complete search history.

(56) References Cited

U.S. PATENT DOCUMENTS

| | | | |
|---|---|---|---|
| 8,832,325 B1* | 9/2014 | George ................. | G06F 3/067 710/21 |
| 10,467,107 B1* | 11/2019 | Abrol ................... | G06F 11/108 |
| 10,924,548 B1* | 2/2021 | Karumbunathan ........................ | H04L 67/1097 |
| 2009/0254592 A1* | 10/2009 | Marinov .............. | G06F 16/119 |
| 2013/0067163 A1* | 3/2013 | Velayudhan ........... | G06F 13/28 711/E12.001 |
| 2013/0073825 A1* | 3/2013 | Terayama ............. | G06F 12/08 711/E12.002 |
| 2018/0285016 A1 | 10/2018 | Akutsu et al. | |
| 2020/0409583 A1* | 12/2020 | Kusters .............. | G06F 11/0757 |
| 2021/0286540 A1* | 9/2021 | Tylik .................... | G06F 3/0659 |

FOREIGN PATENT DOCUMENTS

WO    WO 2018/029820 A1    2/2018

* cited by examiner

*Primary Examiner* — David Yi
*Assistant Examiner* — Tahilba O Puche
(74) *Attorney, Agent, or Firm* — Baker Botts L.L.P.

(57) ABSTRACT

Each server stores metadata for managing a volume having a logical block mapped to physical blocks of storage devices, and provides a compute host with the volume according to the metadata. A computer system calculates the metadata amount, which is the data amount of the metadata of the volume, for each volume, determines a migration target volume from the volumes based on each metadata amount, and performs volume migration that transfers the computer node that provides the compute host with the migration target volume to a migration destination computer node.

7 Claims, 27 Drawing Sheets

FIG. 16

110 Volume Information

| Volume ID | 291 |
| Storage Controller ID | 292 |
| Compute Host ID | 293 |
| Block Mapping Information List | 294 |
| Storage Features Information | 295 |
| Monitoring Information of Volume | 296 |
| Cache of Current Volume Migration Cost | 297 |

COMPUTER SYSTEM AND LOAD DISTRIBUTION METHOD

BACKGROUND OF THE INVENTION

1. Field of the Invention

The present disclosure relates to a computer system and a load distribution method.

2. Description of Related Art

Computer systems including a plurality of servers for managing storage devices for storing data, such as hyper-converged infrastructure (HCI), are known. In such type of computer system, load on each server can be distributed by performing data migration in which the data stored in the storage device is transferred to a storage device managed by another server, and causing the other server to perform I/O processing of the data.

SUMMARY OF THE INVENTION

In recent years, a computer system has been proposed in which a plurality of storage device boxes and a plurality of servers are connected via a network and the plurality of servers share the same drive box. In such type of computer system, by performing meta-migration, which is data migration that transfers metadata for accessing the storage device box to another server, I/O processing of the data can be executed by the other server.

Meta-migration eliminates the need to transfer the data stored on the storage device like in the traditional data migration, and thus, the migration load due to data migration can be reduced.

However, since the amount of metadata varies depending on the conditions, there is a problem that the migration load cannot be reduced appropriately just by performing meta migration, such as transferring metadata containing a large amount of data.

An object of the present disclosure is to provide a computer system and a load distribution method, capable of reducing the migration load of migration.

The computer system according to one aspect of the present disclosure is a computer system including a storage device for storing data and a plurality of computer nodes for executing read and write to the storage device, in which each computer node stores management information for managing a volume having a logical storage area mapped to a physical storage area of the storage device and provides a compute host with the volume according to the management information, and the computer system calculates the metadata amount, which is the data amount of management information for managing the volume, for each volume, determines a migration target volume from the volumes based on each metadata amount, and performs volume migration that transfers a computer node that provides the compute host with the migration target volume to a migration destination computer node.

According to the present invention, the migration load of migration can be reduced.

BRIEF DESCRIPTION OF THE DRAWINGS

FIG. 16 is a diagram showing an example of volume information;

DESCRIPTION OF EMBODIMENTS

Hereinafter, embodiments of the present disclosure will be described with reference to the drawings.

In the following description, the process may be described with the "program" as the operating subject, but since the program is executed by a processor (for example, a central processing unit (CPU)) to perform a predetermined process while appropriately using a storage resource (for example, a memory) and/or a communication interface device (for example, a port), the subject of the process may be a processor or a device equipped with the processor (for example, a computer). Although the information may be described by an expression such as "AAA table", the information may be expressed by any data structure. That is, the "AAA table" can be referred to as "AAA information" to show that the information does not depend on the data structure. In the following description, the configuration of each table is an example, and one table may be divided into two or more tables, or all or part of the two or more tables may become one table.

Figure 1:
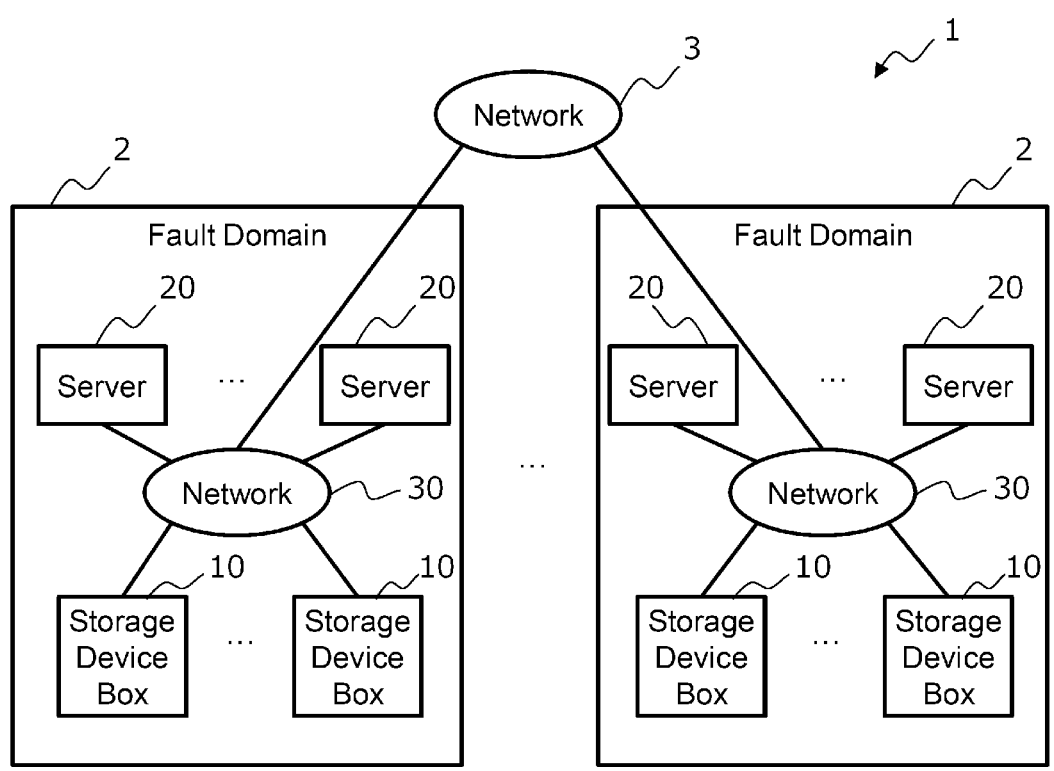
FIG. 1 is a configuration diagram showing a computer system according to an embodiment of the present disclosure.

FIG. 1 is a configuration diagram showing a computer system according to an embodiment of the present disclosure. The computer system 1 shown in FIG. 1 includes one or more fault domains 2. If there are a plurality of fault domains 2, each fault domain 2 is communicably connected to each other via a network 3.

The fault domain 2 includes one or more storage device boxes 10 and one or more servers 20. Each storage device box 10 and each server 20 are communicably connected to each other via a network 30. The network 30 is a high-speed network such as Ethernet (registered trademark). If there are a plurality of fault domains 2, the network 30 is connected to the network 3 that connects the fault domains 2 to each other.

The storage device box 10 is a device provided with one or more storage devices for storing data and is specialized in controlling the storage devices.

The server 20 is a computer node for managing a storage device and is a device that executes an application program used by a user of the computer system, a storage controller for controlling the storage device, and the like. The server 20 may include a storage device.

If there are a plurality of fault domains 2, data redundancy may be performed between each storage device of the two or more fault domains so that the computer system 1 can continue in the other fault domain 2 even if one of the plurality of fault domains 2 crashes. Data redundancy methods include, for example, replication and erasure coding.

Figure 2:
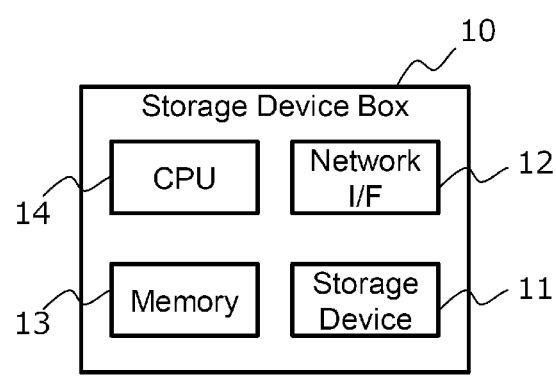
FIG. 2 is a diagram showing a hardware configuration of a storage device box.

FIG. 2 is a diagram showing a hardware configuration of the storage device box 10. The storage device box 10 shown in FIG. 2 includes a storage device 11, a network I/F 12, a memory 13, and a central processing unit (CPU) 14.

The storage device 11 is a storage device that stores data. The type of the storage device 11 is not particularly limited and examples thereof include a hard disk drive and a solid state drive (SSD). There may be a plurality of storage devices 11.

The network I/F 12 is communicably connected to the server 20 via the network 30 and transmits and receives data to and from the server 20.

The memory 13 is a recording medium that can be read by the CPU 14 and stores a program that defines the operation of the CPU 14. The memory 13 may be a volatile memory such as a dynamic random access memory (DRAM) or may be a non-volatile memory such as a storage class memory (SCM).

The CPU 14 is a processor that realizes various functions by reading a program stored in the memory 13 and executing the read program.

Figure 3:
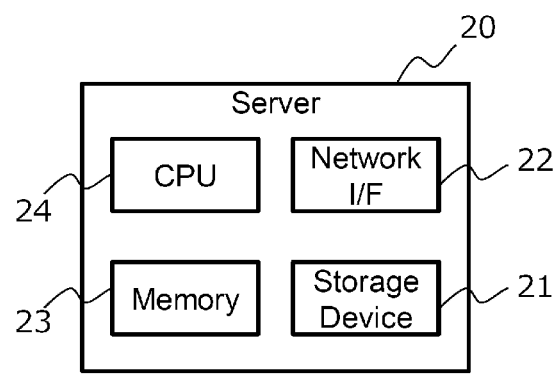
FIG. 3 is a diagram showing a hardware configuration of a server.

FIG. 3 is a diagram showing a hardware configuration of the server 20. The server 20 shown in FIG. 3 includes a storage device 21, a network I/F 22, a memory 23, and a CPU 24.

The storage device 21 is a storage device that stores data. The type of the storage device 21 is not particularly limited and examples thereof include a hard disk drive and an SSD. There may be a plurality of storage devices 21.

The network I/F 22 is communicably connected to the storage device box 10 and another server 20 via the network 30 and transmits and receives data to and from the storage device box 10 and the other server 20.

The memory 23 is a recording medium that can be read by the CPU 24 and stores a program that defines the operation of the CPU 24 and various information used by the CPU 24. The memory 23 may be a volatile memory such as DRAM or may be a non-volatile memory such as SCM.

The CPU 24 is a processor that realizes various functions by reading a program stored in the memory 23 and executing the read program.

Figure 4:
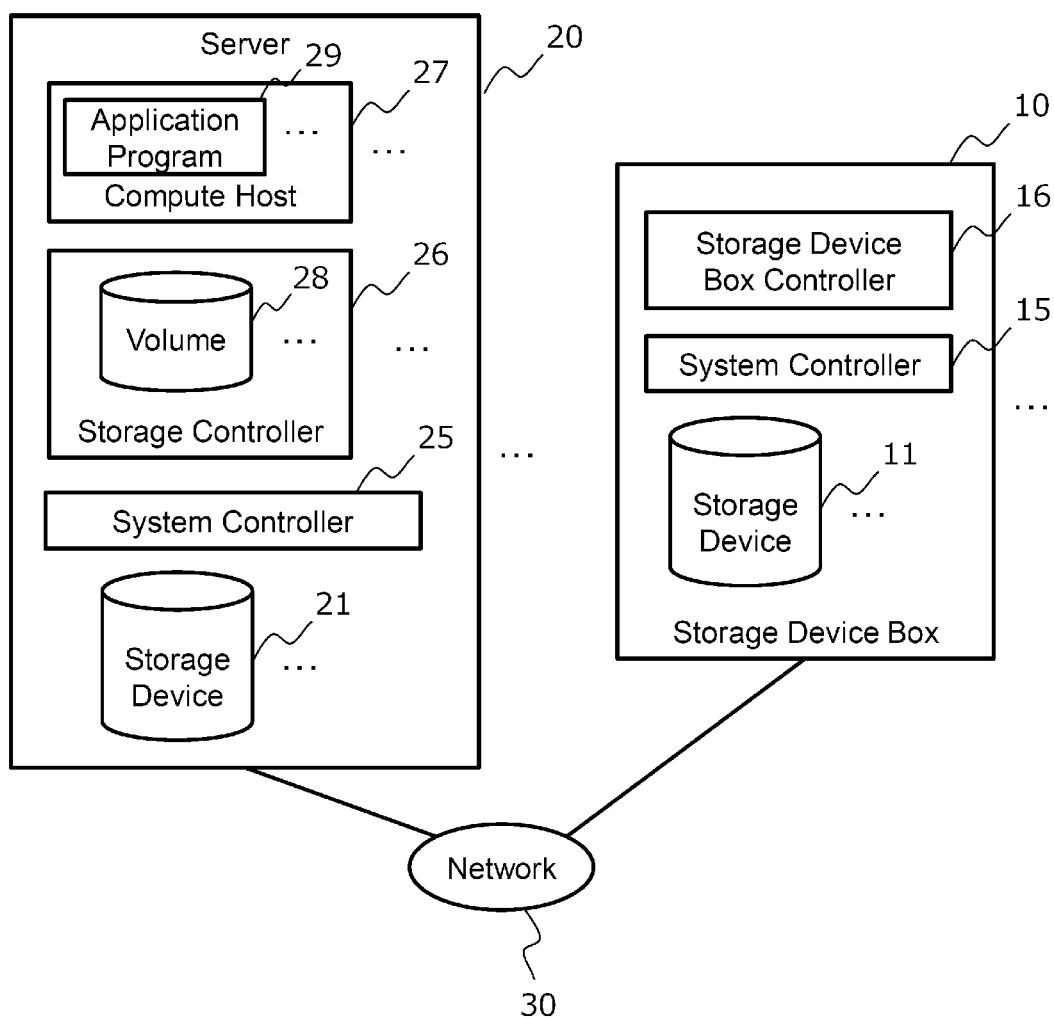
FIG. 4 is a diagram showing a functional configuration of the storage device box and the server.

FIG. 4 is a diagram showing a functional configuration of the storage device box 10 and the server 20. As shown in FIG. 4, the storage device box 10 includes the storage device 11, a system controller 15, and a storage device box controller 16.

The system controller 15 is a program that controls the hardware and software of the storage device box 10, and is, for example, an operating system (OS) or a hypervisor. The system controller 15 has a function of transmitting and receiving data to and from the server 20.

The storage device box controller 16 is a program that operates on the system controller 15 and controls the storage device 11. For example, the storage device box controller 16 communicates with the server 20 (specifically, a storage controller 26 described later) and executes I/O processing for the storage device 11 in response to an I/O request from the server 20, and then returns the processing result to the server 20.

As shown in FIG. 4, the server 20 includes the storage device 21, a system controller 25, the storage controller 26, and a compute host 27.

The system controller 25 is a program that controls the hardware and software of the server 20, and is, for example, an operating system (OS) or a hypervisor. The system controller 25 has a function of transmitting and receiving data to and from the storage device box 10 and another server 20.

The storage controller 26 and the compute host 27 are programs that operate on the system controller 25.

The storage controller 26 controls the storage device 21 of the server 20 itself and the storage device 11 in the storage device box 10.

For example, the storage controller 26 manages a volume 28 which is a logical storage area provided to the compute host 27 (specifically, an application program 29 described later). There may be a plurality of volumes 28 in one server 20. The volume 28 is configured with a plurality of logical blocks and each logical block is mapped to a physical block which is a management unit of a physical storage area of the storage devices 11 and 21. The mapping relationship between the logical block and the physical block is called block mapping and is managed by the storage controller 26 (see FIG. 5).

The storage controller 26 executes read and write to the volume 28 in response to an I/O request for the volume 28 from the compute host 27 and returns the result to the compute host 27.

The storage controller 26 manages the owner right in charge of accessing the volume 28 and the storage devices 11 and 21. By migrating the owner right to the storage controller 26 of another server 20, the load of the computer system can be distributed. The migration of the owner right is performed by transmitting metadata related to the owner right.

The storage controller 26 provides the volume 28 with various data management functions related to the volume 28. The data management function provides, for example, a capacity virtualization function (for example, a thin provisioning function), a capacity reduction function (for example, a compression function, a deduplication function, and a snapshot function), a data protection function (for example, a redundant arrays of inexpensive disks (RAID) function, and an erasure coding function), and the like. The data management function changes the metadata amount, which is the data amount of metadata of the volume 28.

The compute host 27 is a program that controls the hardware resources (network I/F 22, memory 23, CPU 24, and the like) of the server 20. The compute host 27 is, for example, a virtual machine monitor (VMM) or a container.

The application program is executed on the compute host 27. The application program 29 is a program used by a user of the computer system. The application program 29 makes an I/O request to the volume 28 provided by the storage controller 26.

Figure 5:
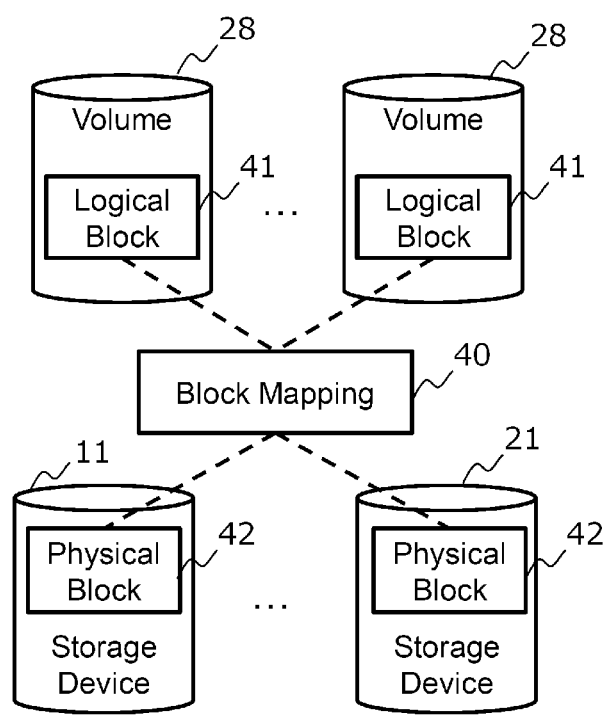
FIG. 5 is a diagram for illustrating block mapping.

FIG. 5 is a diagram for illustrating block mapping.

The volume 28 is managed in a unit called a logical block 31. The data storage areas of the storage devices 11 and 21 are managed in units called physical blocks 32. The correspondence between a logical block 41 and a physical block 42 is called block mapping 40. The size of the logical block 41 may be fixed, but in the present embodiment, the size is variable in order to support data compression processing and the like.

In the block mapping 40, one logical block 41 corresponds to one or more physical blocks 42. The logical block 41 of a certain volume 28 may be shared (mapped to the same physical block) with the logical block 41 of another volume 28. For example, when a deduplication function or a snapshot function is used, the logical block 41 of a certain volume 28 is shared with the logical block 41 of another volume 28.

The storage controller 26 may support a log structure method in which new data is added to a new physical block without updating the data in the physical block when the data in the logical block 41 is updated. Here, every time the data is written, the physical block 42 that stores the data is changed, and thus, new block mapping 40 is generated. The old block mapping 40 is deleted by garbage collection processing or the like when the storage controller 26 that uses the block mapping 40 no longer exists.

Figure 6:
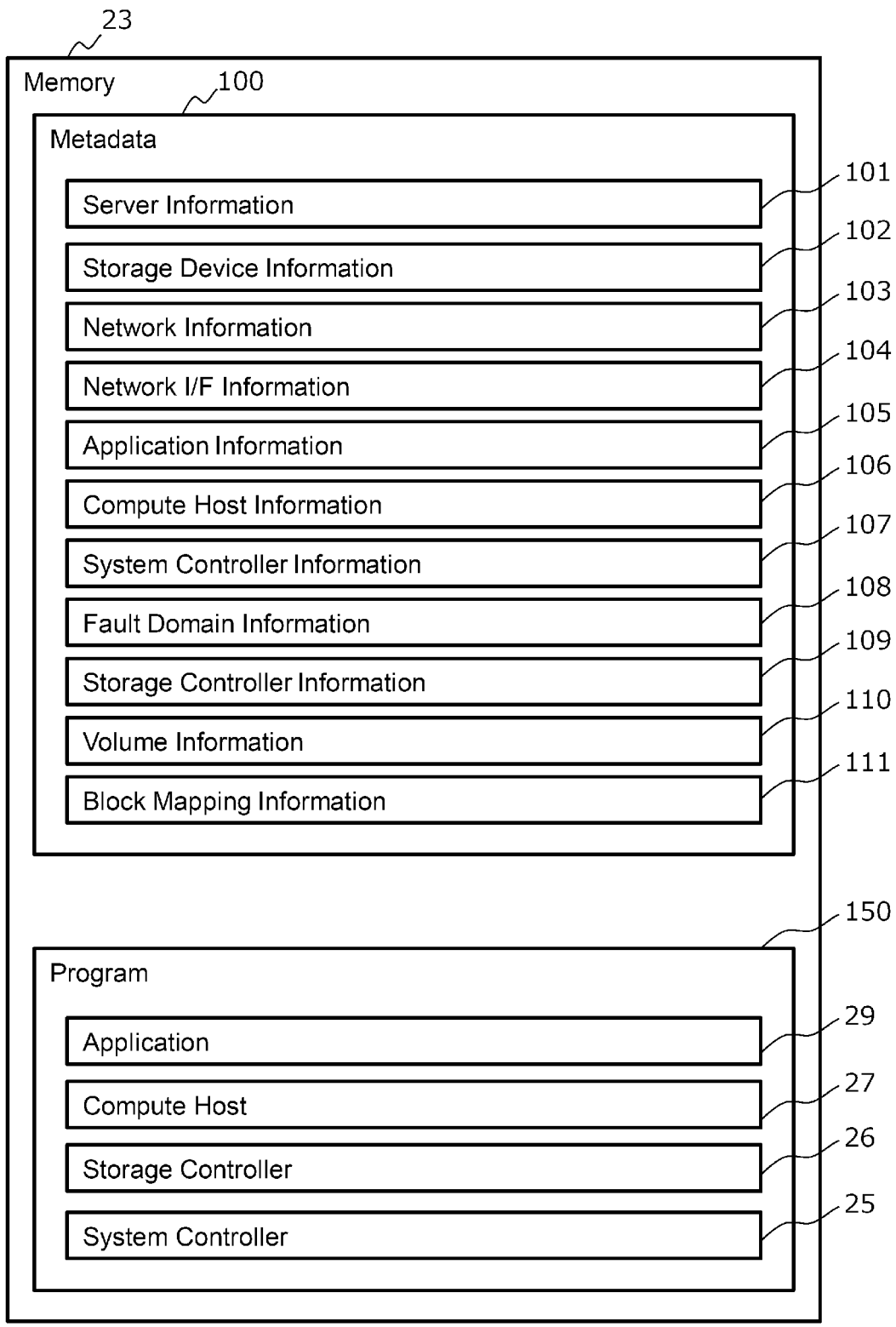
FIG. 6 is a diagram showing the internal configuration of metadata and a program stored in a memory of the server.

FIG. 6 is a diagram showing the internal configuration of the metadata and the program stored in the memory 23 of the server 20. The metadata 100 shown in FIG. 6 is data related to the server 20 (hereinafter, referred to as the server 20) that stores the metadata 100 and includes server information 101, storage device information 102, network information 103, network I/F information 104, application information 105, compute host information 106, system controller information 107, fault domain information 108, storage controller information 109, volume information 110, and block mapping information 111. The program 150 includes the system controller 25, the storage controller 26, the compute host 27, and the application program 29.

Figure 7:
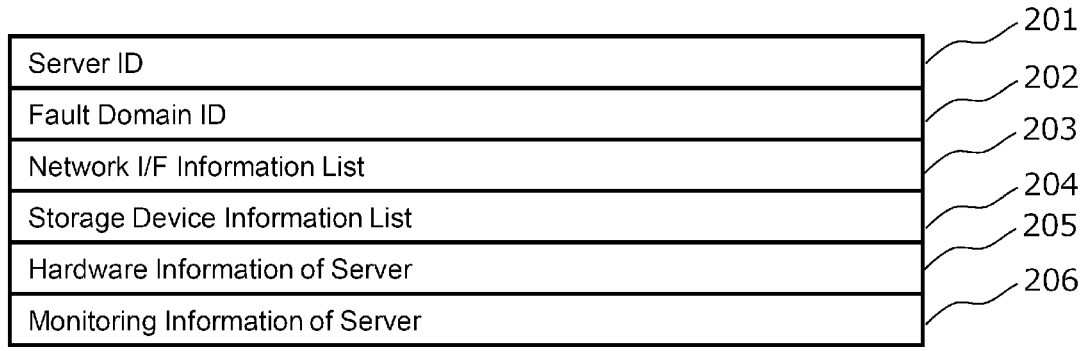
FIG. 7 is a diagram showing an example of server information.

FIG. 7 is a diagram showing an example of the server information 101. The server information 101 shown in FIG. 7 includes fields 201 to 206.

The field 201 stores a server ID, which is identification information for identifying the server 20. The field 202 stores a fault domain ID, which is identification information for identifying the fault domain 2 to which the server 20 belongs. The field 203 stores a network I/F information list, which is a list of network I/F information 104 stored in the server 20. The field 204 stores a storage device information list, which is a list of storage device information 102 stored in the server 20. The field 205 stores the server hardware information related to the hardware of the server 20. The field 206 stores server monitoring information, which is monitoring information related to the hardware and software of the server 20. The server monitoring information is, for example, the load (utilization rate) of the memory 23 and the CPU 24.

Figure 8:
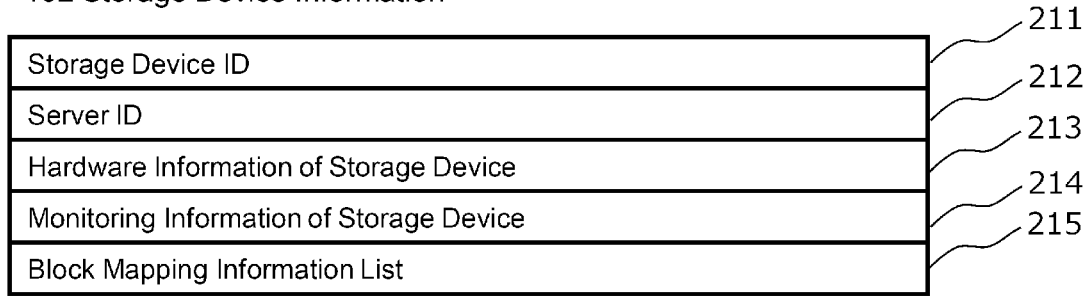
FIG. 8 is a diagram showing an example of storage device information.

FIG. 8 is a diagram showing an example of the storage device information 102. The storage device information 102 shown in FIG. 8 includes fields 211 to 215. The storage device information 102 is prepared for each storage device (hereinafter, referred to as the storage device 21) included in the server 20.

The field 211 stores a storage device ID, which is identification information for identifying the storage device 21. The field 212 stores a server ID that identifies the server 20 (the server 20 including the storage device 21). The field 213 stores the storage device hardware information related to the hardware of the storage device 21. The storage device hardware information indicates specifications such as storage capacity, for example. The field 214 stores storage device monitoring information, which is monitoring information related to the storage device. The storage device monitoring information indicates, for example, a load (amount of I/O request, or the like). The field 215 stores a block mapping information list, which is a list of block mapping information 111 including a physical block corresponding to the storage device 21.

Figure 9:
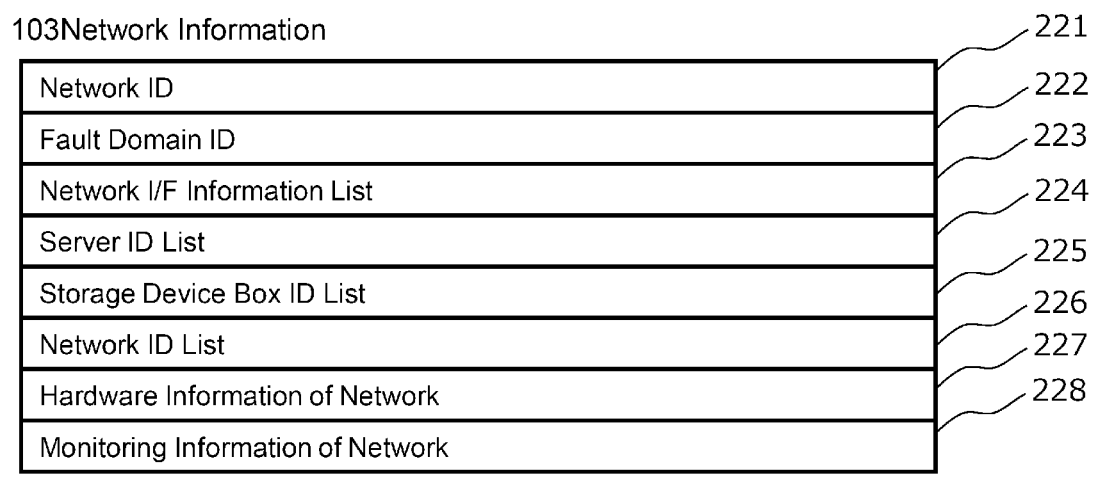
FIG. 9 is a diagram showing an example of network information.

FIG. 9 is a diagram showing an example of the network information 103. The network information 103 shown in FIG. 9 includes fields 221 to 228. The network information 103 is prepared for each network 3 (hereinafter, referred to as the network 3) to which the server 20 is connected.

The field 221 stores a network ID, which is identification information for identifying the network 3. The field 222 stores a fault domain ID that identifies the fault domain to which the network 3 belongs. The field 223 stores a network I/F information list, which is a list of network I/F information 104 of the network I/Fs 12 and 22 connected to the network 3. The field 224 stores a server ID list, which is a list of server IDs of the server 20 connected to the network 3.

The field 225 stores a storage device box ID list, which is a list of storage device box IDs which are identification information for identifying the storage device box 10 connected to the network 3. The field 226 stores a network ID list, which is a list of network IDs of other networks 3 connected to the network 3. The field 227 stores network hardware information, which is information related to the hardware of the network 3. The network hardware information is, for example, information related to a switch (not shown) on the network 3. The field 228 stores network monitoring information, which is monitoring information related to the network 3. The network monitoring information is, for example, a load on the switch on the network 3.

Figure 10:
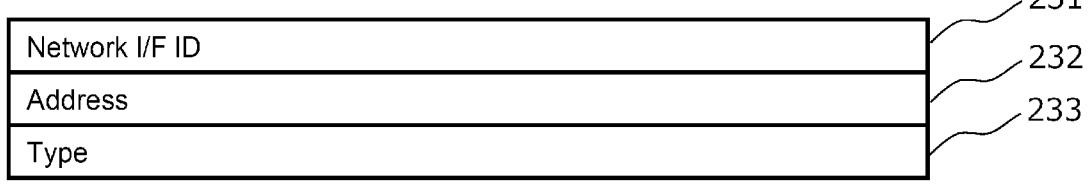
FIG. 10 is a diagram showing an example of network I/F information.

FIG. 10 is a diagram showing an example of network I/F information 104. The network I/F information 104 shown in FIG. 10 includes fields 231 to 233. The network I/F information 104 is prepared for each network I/F 22 (hereinafter, referred to as the network I/F 22) included in the server 20.

The field 231 stores a network I/F ID, which is identification information for identifying the network I/F 22. The field 232 stores the address of the network I/F 22 on the network 3. The address is, for example, an IP address and a port number. The field 233 stores the type of the network I/F 22. The type indicates, for example, the use of the network I/F (for management, data transmission, or the like).

Figure 11:
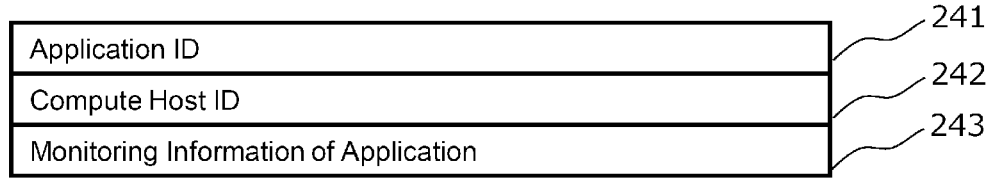
FIG. 11 is a diagram showing an example of application information.

FIG. 11 is a diagram showing an example of the application information 105. The application information 105 shown in FIG. 11 includes fields 241 to 243. The application information 105 is prepared for each application program 29 (hereinafter, referred to as the application program 29) included in the server 20.

The field 241 stores an application ID, which is identification information for identifying the application program 29. The field 242 stores a compute host ID, which is identification information for identifying the compute host 27 executed by the application program 29. The field 243 stores application monitoring information, which is monitoring information related to the application program 29. The application monitoring information is, for example, a load on the hardware resource of the application program 29.

Figure 12:
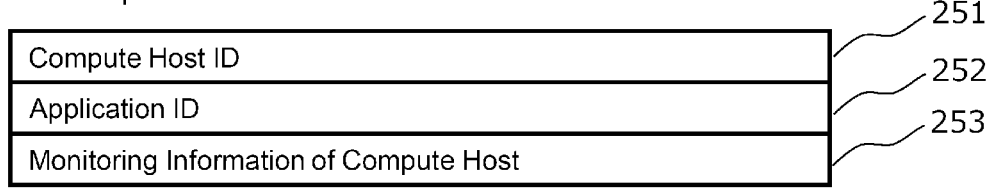
FIG. 12 is a diagram showing an example of compute host information.

FIG. 12 is a diagram showing an example of the compute host information 106. The compute host information 106 shown in FIG. 12 includes fields 251 to 253. The compute host information 106 is prepared for each compute host 27 (hereinafter, referred to as the compute host 27) included in the server 20.

The field 251 stores a compute host ID, which is identification information for identifying the compute host 27. The field 252 stores an application ID, which is identification information for identifying the application program 29 executed on the compute host 27. The field 253 stores compute host monitoring information, which is monitoring information related to the compute host 27. The compute host monitoring information is, for example, a load on the hardware resource of the compute host 27.

Figure 13:
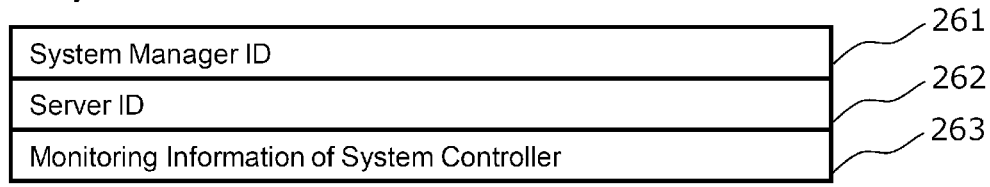
FIG. 13 is a diagram showing an example of system controller information.

FIG. 13 is a diagram showing an example of the system controller information 107. The system controller information 107 shown in FIG. 13 includes fields 261 to 263. The system controller information 107 is prepared for each system controller 25 (hereinafter, referred to as the system controller 25) included in the server 20.

The field 261 stores a system controller ID, which is identification information for identifying the system controller 25. The field 262 stores the server ID of the server 20 (the server 20 that executes the system controller 25). The field 263 stores system controller monitoring information, which is monitoring information related to the system controller 25. The system controller monitoring information is, for example, a load on the hardware resource of the system controller 25.

Figure 14:
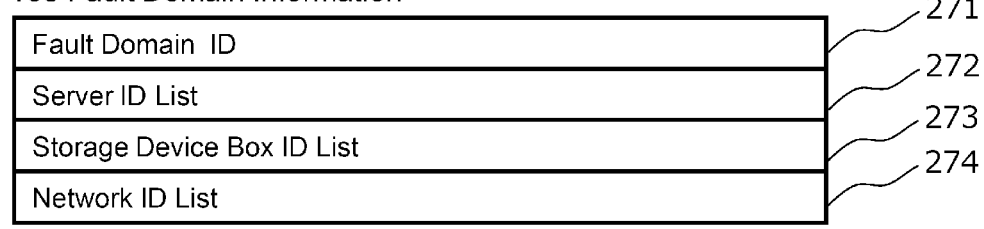
FIG. 14 is a diagram showing an example of fault domain information.

FIG. 14 is a diagram showing an example of the fault domain information 108. The fault domain information 108 shown in FIG. 14 includes fields 271 to 274.

The field 271 stores a fault domain ID, which is identification information for identifying the fault domain 2 to which the server 20 belongs (hereinafter referred to as the fault domain 2). The field 272 stores a server ID list, which is a list of server IDs of the server 20 belonging to the fault domain 2. The field 273 stores a storage device box ID list, which is a list of storage device box IDs of the storage device boxes 10 belonging to the fault domain 2. The field 274 stores a network ID list, which is a list of network IDs of the network 3 belonging to the fault domain 2.

Figure 15:
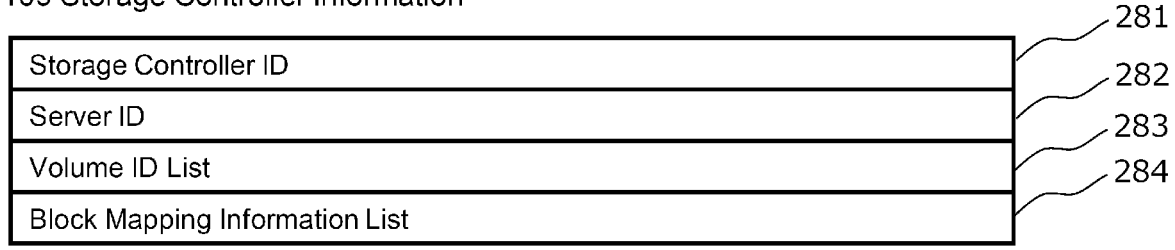
FIG. 15 is a diagram showing an example of storage controller information.

FIG. 15 is a diagram showing an example of the storage controller information 109. The storage controller information 109 shown in FIG. 15 includes fields 281 to 284. The storage controller information 109 is prepared for each storage controller 26 (hereinafter, referred to as the storage controller 26) included in the server 20.

The field 281 stores a storage controller ID, which is identification information for identifying the storage controller 26. The field 282 stores the server ID of the server 20 (the server 20 that executes the storage controller 26). The field 283 stores a volume ID list, which is a list of volume IDs, which are identification information for identifying volumes to which the storage controller 26 has the owner right. The field 284 stores a block mapping information list, which is a list of block mapping information 111 to which the storage controller 26 has the owner right.

FIG. 16 is a diagram showing an example of the volume information 110. The volume information 110 shown in FIG. 16 includes fields 291 to 297. The volume information 110 is prepared for each volume 28 (hereinafter, referred to as the volume 28) to which the storage controller 26 has the owner right.

The field 291 stores a volume ID, which is identification information for identifying the volume 28. The field 292 stores the storage controller ID of the storage controller 26 that has the owner right of the volume 28. The field 293 stores the compute host ID of the compute host 27 that uses the volume 28. The field 294 stores a block mapping information list, which is a list of block mapping information 111 having a logical block corresponding to the volume 28. The field 295 stores storage features information indicating the data management function applied to the volume 28. The field 296 stores volume monitoring information, which is monitoring information related to the volume 28. The volume monitoring information is, for example, IOPS (the load on the hardware resource of the volume 28). The field 297 stores migration cost information (Cache of Current Volume Migration Cost) indicating a migration cost (migration processing cost) which is a volume migration cost (migration data amount, CPU load, and the like) of the volume 28.

Figure 17:
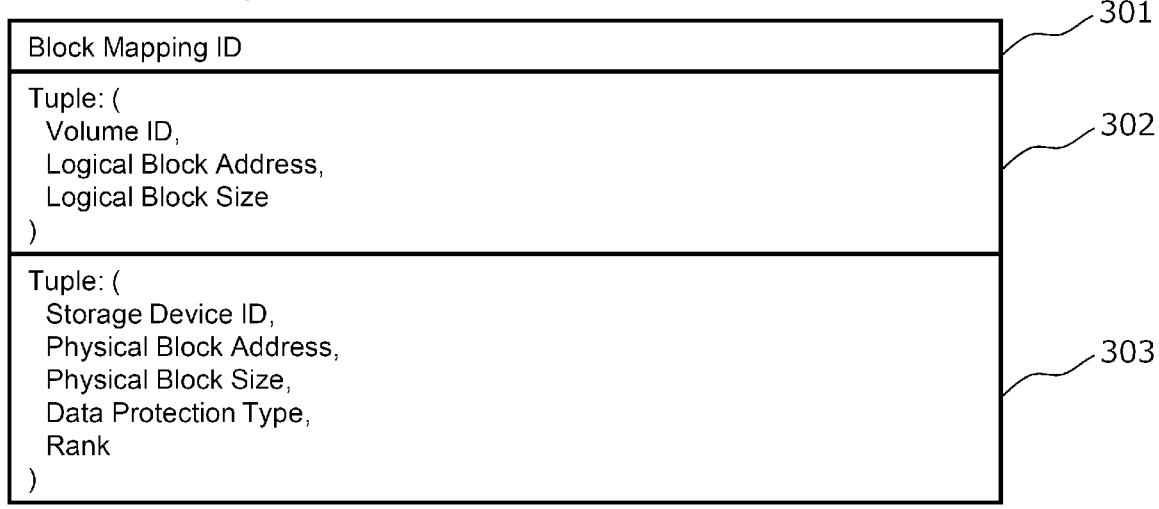
FIG. 17 is a diagram showing an example of block mapping information.

FIG. 17 is a diagram showing an example of block mapping information 111. The block mapping information 111 shown in FIG. 17 includes fields 301 to 303. The block mapping information 111 is prepared for each block mapping information 111 (hereinafter, referred to as the block mapping information 111) to which the storage controller 26 has the owner right.

The field 301 stores a block mapping ID, which is identification information for identifying the block mapping information 111. The field 302 stores logical block information regarding the related logical block related to the block mapping information 111. The field 303 stores physical block information regarding the related physical block related to the block mapping information 111.

When data management functions such as a deduplication function and a snapshot function are used, logical block information is provided for each volume because a plurality of volumes may share the same physical block. Each logical block information is a tuple including the volume ID of the volume corresponding to the related logical block, the logical block address (LBA) of the related logical block, and the logical block size of the related logical block.

Physical block information is provided for each storage device. Each physical block information is a tuple that includes the storage device ID of the storage device corresponding to the related physical block, the start address (physical block address) of the related physical block, the data protection type of data protection function used, and the priority (rank) in the data protection set by the data protection function.

Figure 18:
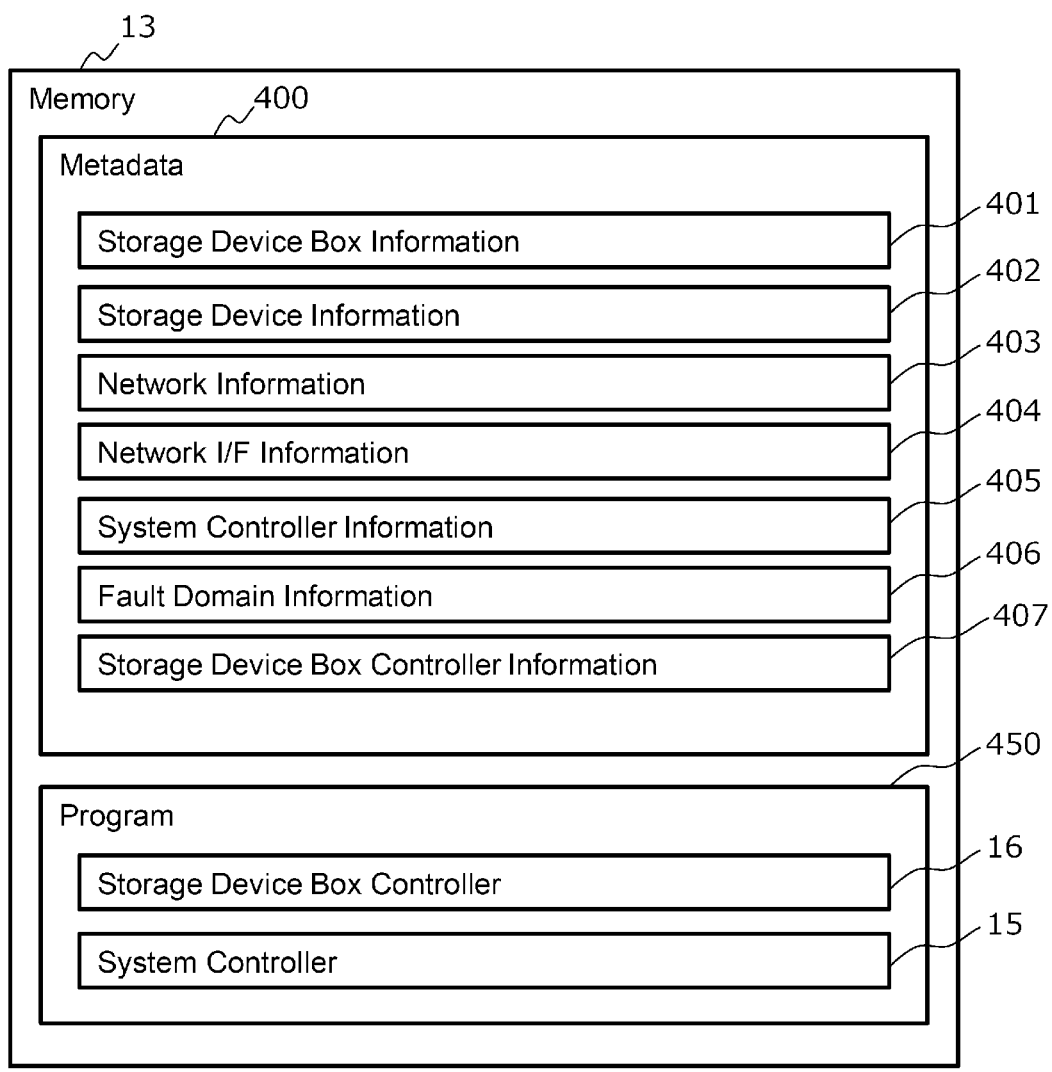
FIG. 18 is a diagram showing the internal configuration of metadata and a program stored in a memory of the storage device box.

FIG. 18 is a diagram showing an internal configuration of the metadata and the program stored in the memory 13 of the storage device box 10. A metadata 400 shown in FIG. 18 is data related to the storage device box 10 (hereinafter, referred to as the storage device box 10) that stores the metadata 100, and includes storage device box information 401, storage device information 402, network information 403, network I/F information 404, system controller information 405, fault domain information 406, and storage device box controller information 407. The program 450 includes the system controller 15 and the storage device box controller 16.

Figure 19:
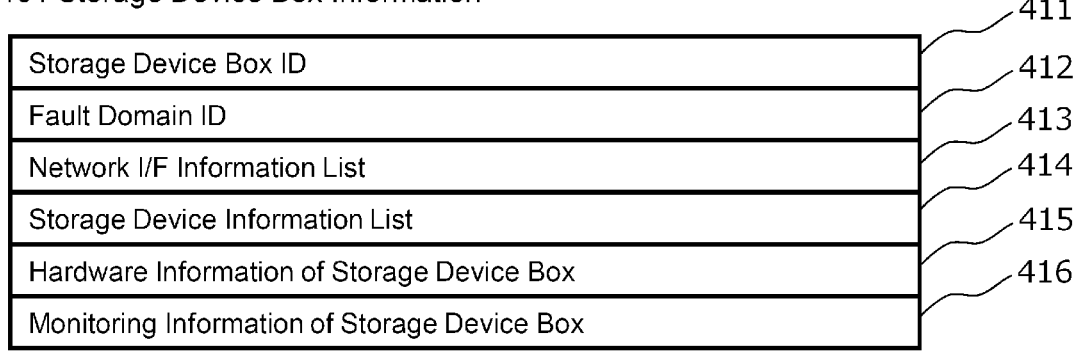
FIG. 19 is a diagram showing an example of storage device box information 401.

FIG. 19 is a diagram showing an example of the storage device box information 401. The storage device box information 401 shown in FIG. 19 includes fields 411 to 416.

The field 411 stores a storage device box ID, which is identification information for identifying the storage device box 10. The field 412 stores the fault domain ID of the fault domain 2 to which the storage device box 10 belongs. The field 413 stores a network I/F information list, which is a list of network I/F information 404 stored in the storage device box 10. The field 414 stores a storage device information list, which is a list of storage device information 402 stored in the storage device box 10. The field 415 stores storage device box hardware information related to the hardware of the storage device box 10. The field 416 stores storage device box monitoring information, which is monitoring information related to the hardware and software of the storage device box 10. The storage device box monitoring information is, for example, the load (utilization rate) of the memory 13 and the CPU 14.

In FIG. 18, the storage device information 402, the network information 403, the network I/F information 404, the system controller information 405, the fault domain information 406, and the storage device box controller information 407 correspond to the storage device information 102, the network information 103, the network I/F information 104, the system controller information 107, the fault domain information 108, and the storage controller information 109, respectively.

However, in the storage device information 402, the storage device box ID is stored instead of the server ID shown in FIG. 8. In the system controller information 107, the storage device box ID is stored instead of the server ID shown in FIG. 13.

The metadata 100 and 400 described above may be persisted (stored) in at least one of the storage device 11 of the storage device box 10 and the storage device 21 of the server 20. Here, the same metadata may be stored in a plurality of storage devices to make the metadata redundant. The storage device that stores the metadata 100 and 400 is not particularly limited. The programs 150 and 450 may also be persisted to at least one of the storage devices 11 and 21. It is assumed that the various identification information (ID) included in each metadata is a unique value in the computer system 1. The identification information is composed of, for example, a numerical value or a character string such as a universally unique identifier (UUID).

Figure 20:
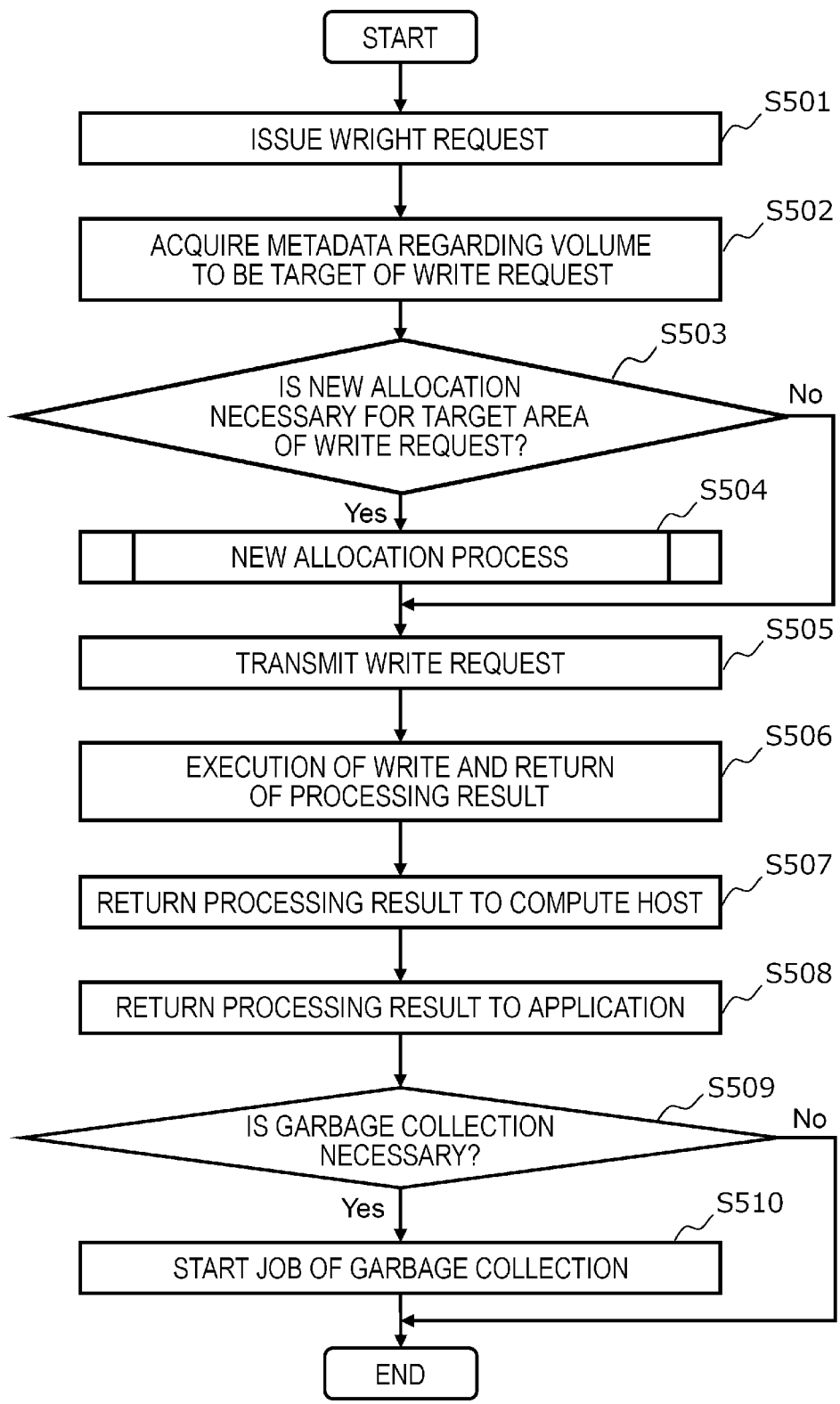
FIG. 20 is a flowchart for illustrating an example of write processing.

FIG. 20 is a flowchart for illustrating an example of write processing by the present computer system. When the application program 29 of the server 20 issues a write request, the following write processing is executed.

In the write processing, first, the compute host 27 issues a write request to the storage controller 26 (step S501). When the storage controller 26 receives the write request, the storage controller 26 acquires the metadata regarding the volume 28 that is the target of the write request from the metadata stored in the memory 23 (step S502).

Based on the acquired metadata, the storage controller 26 determines whether a new allocation of the storage area (physical block) in which the write data is written is required in response to the write request (step S503). The new allocation is required when a predetermined data management function is enabled. The predetermined data management function is, for example, a data protection function, a compression function, a deduplication function, a snapshot function, and a thin provisioning function. However, in the case of the thin provisioning function, a new allocation is required only when the storage area is not allocated to the write data. Note that the more write requests, the greater the amount of metadata related to the volume 28 due to the new allocation.

If a new allocation is required, the storage controller executes a new allocation process (see FIG. 21) to determine a physical block for storing write data in response to the write request (step S504). If no new allocation is required, the storage controller 26 skips the process of step S504.

The storage controller 26 transmits the write request to the storage device box controller 16 or the storage controller 26 of the storage device box 10 or the server 20 including the storage device 11 or 21 having the storage area for storing the write data (step S505).

Upon receiving the write request, the storage device box controller 16 or the storage controller 26 writes the write data to the storage device 11 or 21 according to the write request and returns the processing result to the storage controller 26 which is the source of the write request (step S506).

Upon receiving the processing result, the storage controller 26 returns the processing result to the compute host 27 (step S507). The compute host 27 returns the processing result to the application program 29 (step S508).

The storage controller 26 determines whether garbage collection is required (step S509). For example, if a data management function (predetermined data management function (compression function, deduplication function, snapshot function, data protection function, and the like)) that supports a log structure method that adds new data to a new physical block is used, the storage controller 26 determines that garbage collection is required.

If garbage collection is required, the storage controller 26 starts a garbage collection job (step S510) and ends the process. On the other hand, if garbage collection is not required, the storage controller 26 skips the process of step S510 and ends the process. The garbage collection job may be a synchronous execution method job or an asynchronous execution method job.

Figure 21:
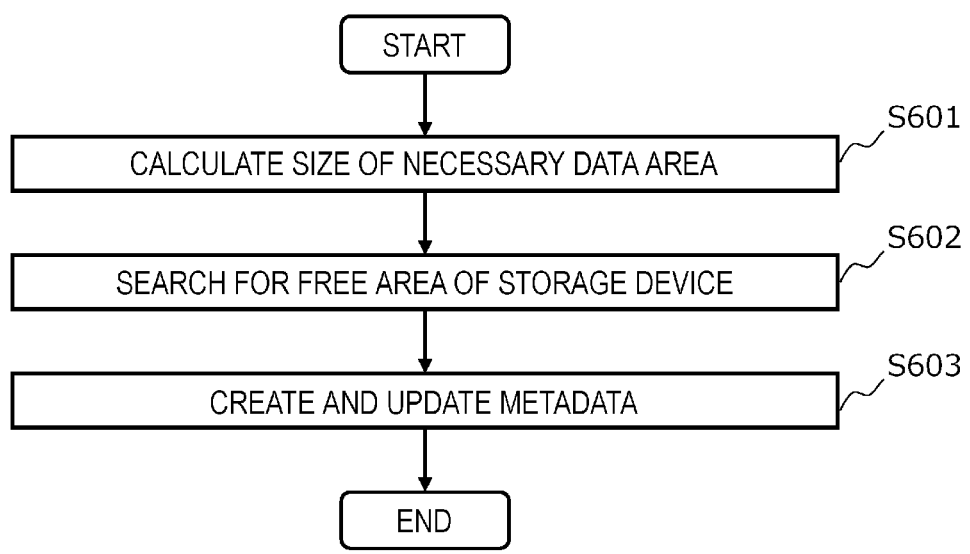
FIG. 21 is a flowchart for illustrating an example of a new allocation process.

FIG. 21 is a flowchart for illustrating an example of the new allocation process in step S504 of FIG. 20.

In the new allocation process, based on the write request and the setting of the data management function (for example, the data reduction function and the data capacity virtualization function) valid for the volume 28 that is the target of the write request, the storage controller 26 calculates the size of the storage area required for storing the write data by the write request (step S601).

The storage controller 26 searches for free areas of the storage devices 11 and 21 based on the calculated size of the data area and the setting of the data protection function valid for the volume 28 that is the target of the write request, and allocates the storage area (step S602).

The storage controller 26 executes the creation and update of metadata (step S603) and ends the process.

Figure 22:
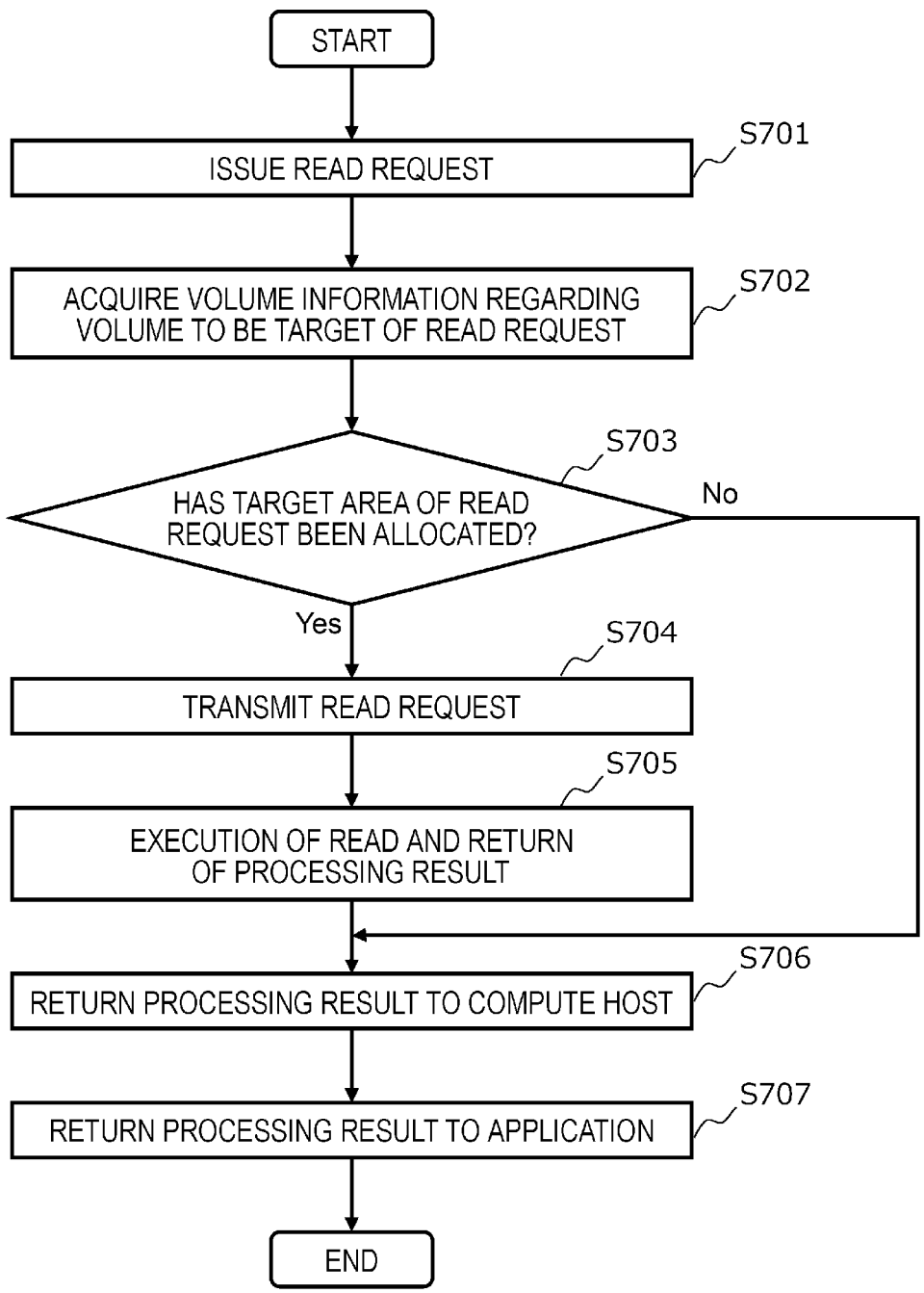
FIG. 22 is a flowchart for illustrating an example of reading processing.

FIG. 22 is a flowchart for illustrating an example of read processing by the computer system. When the application program 29 of the server 20 issues a read request, the following read processing is executed.

In the read processing, first, the compute host 27 issues a read request to the storage controller 26 (step S701). When the storage controller 26 receives the read request, the storage controller 26 acquires the volume information regarding the volume 28 that is the target of the read request from the metadata stored in the memory 23 (step S702).

The storage controller 26 determines whether the storage area (physical block) in which the data to be read by the read request is stored has been allocated based on the acquired metadata (step S703).

If the storage area has been allocated, the storage controller 26 transmits the read request to the storage device box controller 16 or the storage controller 26 of the storage device box 10 or the server 20 including the storage device 11 or 21 having the storage area where the data to be read by the read request is stored (step S704).

Upon receiving the read request, the storage device box controller 16 or the storage controller 26 reads the read data from the storage device 11 or 21 according to the read request and returns the processing result to the storage controller 26 which is the source of the read request (step S705).

Upon receiving the processing result, the storage controller 26 returns the processing result to the compute host 27 (step S706). The compute host 27 returns the processing result to the application program 29 (step S707) and ends the process.

If the storage area has not been allocated in step S703 of the read processing, the storage controller 26 skips the processes of steps S704 and S705 and returns information indicating zero data or that the storage area has not been allocated in step S706 to the compute host 27 as a processing result.

Figure 23:
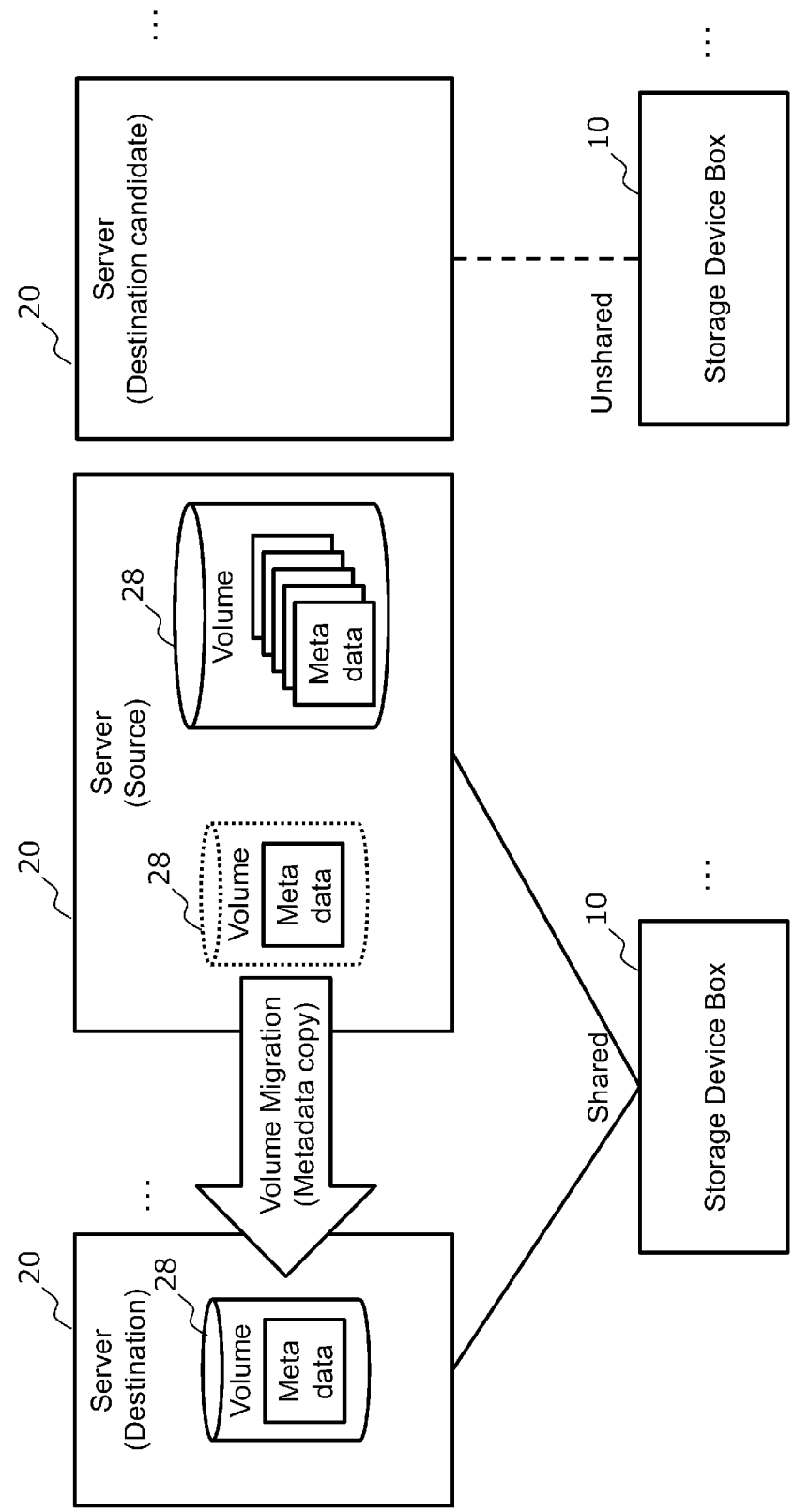
FIG. 23 is a diagram for illustrating the outline of the migration.

FIG. 23 is a diagram for illustrating the outline of migration.

The migration is a process of transferring the server 20 that executes read and write to the data stored in the storage devices 11 and 21 to another server in order to distribute the load of the server 20. In the present embodiment, the computer system 1 performs load distribution by performing volume migration that migrates the volume 28 without performing data migration that migrates the data stored in the storage devices 11 and 12 as much as possible. More specifically, the computer system 1 performs meta-migration that migrates the owner right of the volume 28. Here, the servers 20 of the migration source and the migration destination are selected so that the migration cost of migration is low based on the relationship between the servers 20 and the like. For example, since communication between fault domains 2 usually has a larger number of hops and latency than communication within a fault domain 2, it is desirable to select the servers 20 belonging to the same fault domain 2 (that is, the servers 20 that share the storage device box 10) as the servers 20 of the source and the destination.

The migration will be explained in more detail below.

Figure 24:
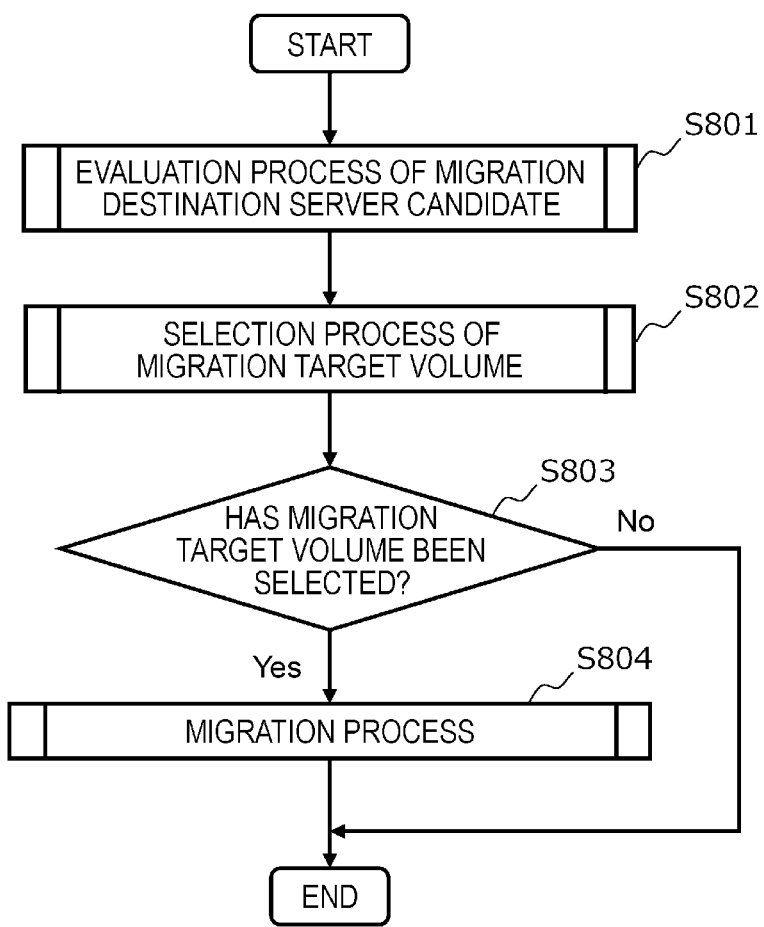
FIG. 24 is a flowchart for illustrating an example of migration job processing.

FIG. 24 is a flowchart for illustrating an example of migration job processing when a migration job by the computer system 1 is started. The migration job processing is executed by the storage controller 26 of the server 20 at a predetermined trigger. The predetermined trigger is, for example, when a new server 20 is added to the computer system 1, when one of the servers 20 is deleted from the computer system 1, and when one of the servers 20 is replaced with another server 20. The predetermined trigger may be a case where the load distribution of the computer system 1 becomes necessary, such as when one of the servers 20 has a high load.

In the migration job processing, the storage controller 26 executes "the evaluation process of the migration destination server candidate (see FIG. 25)" that evaluates migration destination server candidates, which are candidates of the migration destination server of the candidate volume for each candidate volume which is the volume 28 which becomes the migration candidate (step S801). The candidate volume may be specified, for example, in a unit of the server 20, in a unit of the storage controller 26, or in a unit of an individual volume 28. The migration destination server candidates are, for example, all servers 20 other than the server 20 having the candidate volume.

Subsequently, based on the evaluation result of the evaluation process of the migration destination server candidate in step S801, the storage controller 26 executes "the selection process of a migration target volume (see FIG. 26)" that selects a migration target volume, which is a volume to be migrated among the candidate volume where a migratable server candidate, which is the migration destination server candidate that can be selected as the migration destination server of the candidate volume, exists (step S802).

The storage controller 26 determines whether the migration target volume has been selected in the selection process of a migration target volume (step S803).

If the migration target volume has been selected, the storage controller 26 executes the "migration process" (see FIG. 27) for the migration target volume (step S804) and ends the process. If the migration target volume has not been selected, the storage controller 26 skips the process of step S804 and ends the process.

Figure 25:
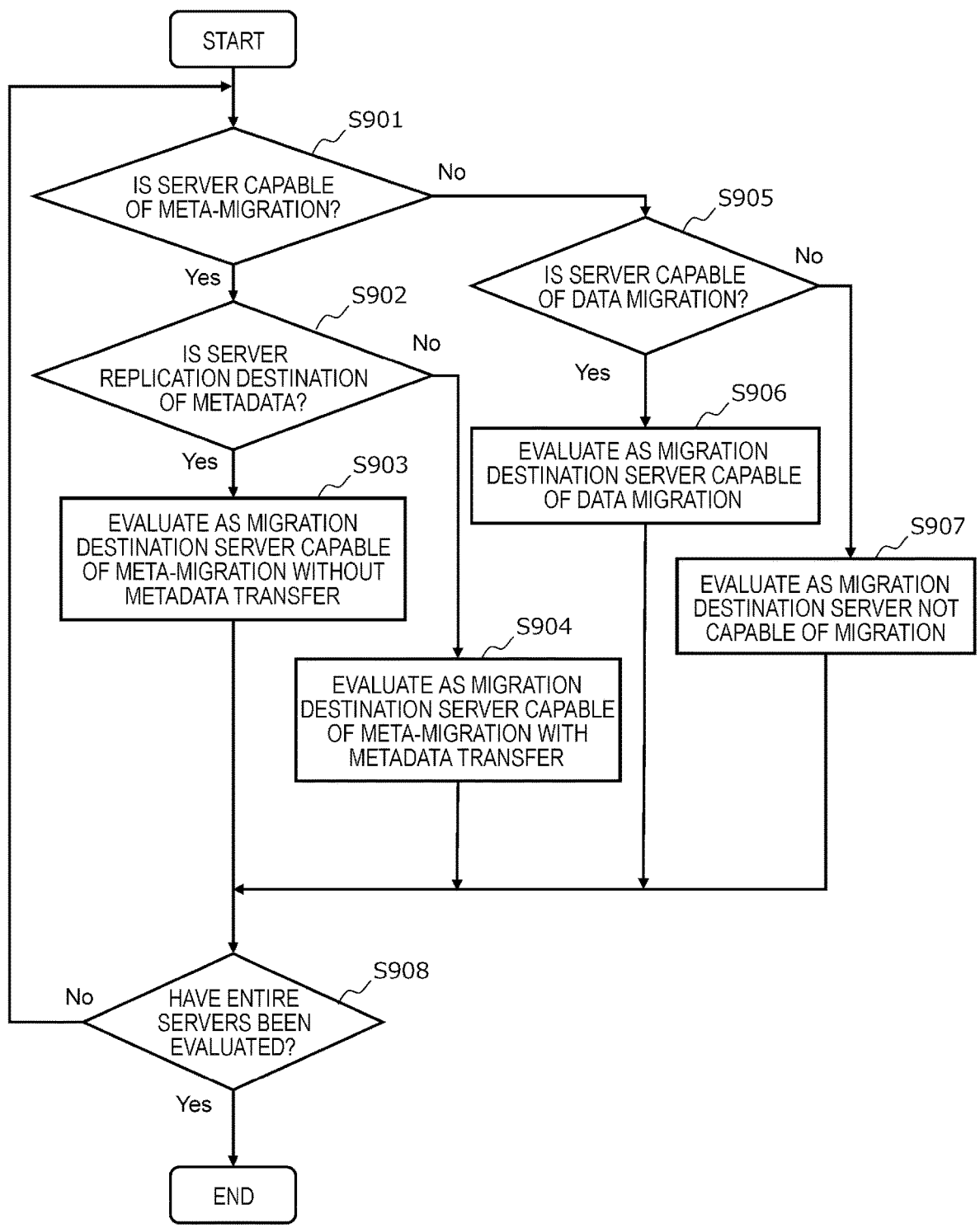
FIG. 25 is a flowchart for illustrating an example of an evaluation process of a migration destination server candidate.

FIG. 25 is a flowchart for illustrating an example of the evaluation process of the migration destination server candidate of S801 of FIG. 4. The storage controller 26 performs the following evaluation process of the migration destination server candidate for each candidate volume.

In the evaluation process of the migration destination server candidate, the storage controller 26 selects one of the servers 20 in the computer system 1 as a migration destination server candidate and determines whether the migration destination server candidate is a server capable of meta-migration (step S901). The server capable of meta-migration is, for example, a server that has free resources (memory 13, CPU 14, and storage devices 11 and 21) and shares the same storage device box 10 with the server having the candidate volume (for example, a server included in the same fault domain 2). The server 20 having free resources is, for example, a server in which a load of each resource (the usage amount of memory 23 and CPU 24, or the like) is lower than a predetermined value.

If the migration destination server candidate is a server capable of meta-migration, the storage controller determines whether the migration destination server candidate is a replication destination server of the metadata related to the candidate volume (step S902). The replication destination server is a server that stores a replica of the metadata when the metadata is made redundant.

If the migration destination server candidate is a replication destination server, the storage controller 26 evaluates the migration destination server candidate as a "migration destination server capable of meta-migration without metadata transfer" (step S903). On the other hand, if the migration destination server candidate is not a replication destination server, the storage controller 26 evaluates the migration destination server candidate as a "migration destination server capable of meta-migration with metadata transfer" (step S904). Both the meta-migration without metadata transfer and the meta-migration with metadata transfer are types of meta-migration. The meta-migration without metadata transfer is a migration in which only the owner right is migrated without transferring the metadata, and the meta-migration with metadata transfer is a migration in which the owner right is migrated at the same time as the metadata is transferred.

If the migration destination server candidate is not a server capable of meta-migration, the storage controller 26 determines whether the migration destination server candidate is a server capable of data migration (step S905). The server capable of data migration is a server that has free resources and is connected to the server 20 having the candidate volume via the network 30 or the like. However, a server that stores data belonging to the same redundancy group as the data stored in the server 20 having the candidate volume is excluded from the servers capable of data migration. A redundancy group is a group that contains data and redundant code for restoring that data.

If the migration destination server candidate is a server capable of data migration, the storage controller 26 evaluates the migration destination server candidate as a "migration destination server capable of data migration" (step S906). On the other hand, if the migration destination server candidate is not a server capable of data migration, the storage controller 26 evaluates the migration destination server candidate as a "migration destination server that cannot be migrated" (step S907).

Then, when the migration destination server candidate is evaluated in steps S903, S904, S906, or S907, the storage controller 26 determines whether all the servers 20 in the computer system 1 have been selected as the migration destination server candidate (step S908).

If all the servers 20 have not been selected, the storage controller 26 returns to the process of step S901 and selects a server that has not yet been selected as a migration destination server candidate. On the other hand, if all the servers have been selected, the storage controller 26 ends the evaluation process of the migration destination server candidate.

Figure 26:
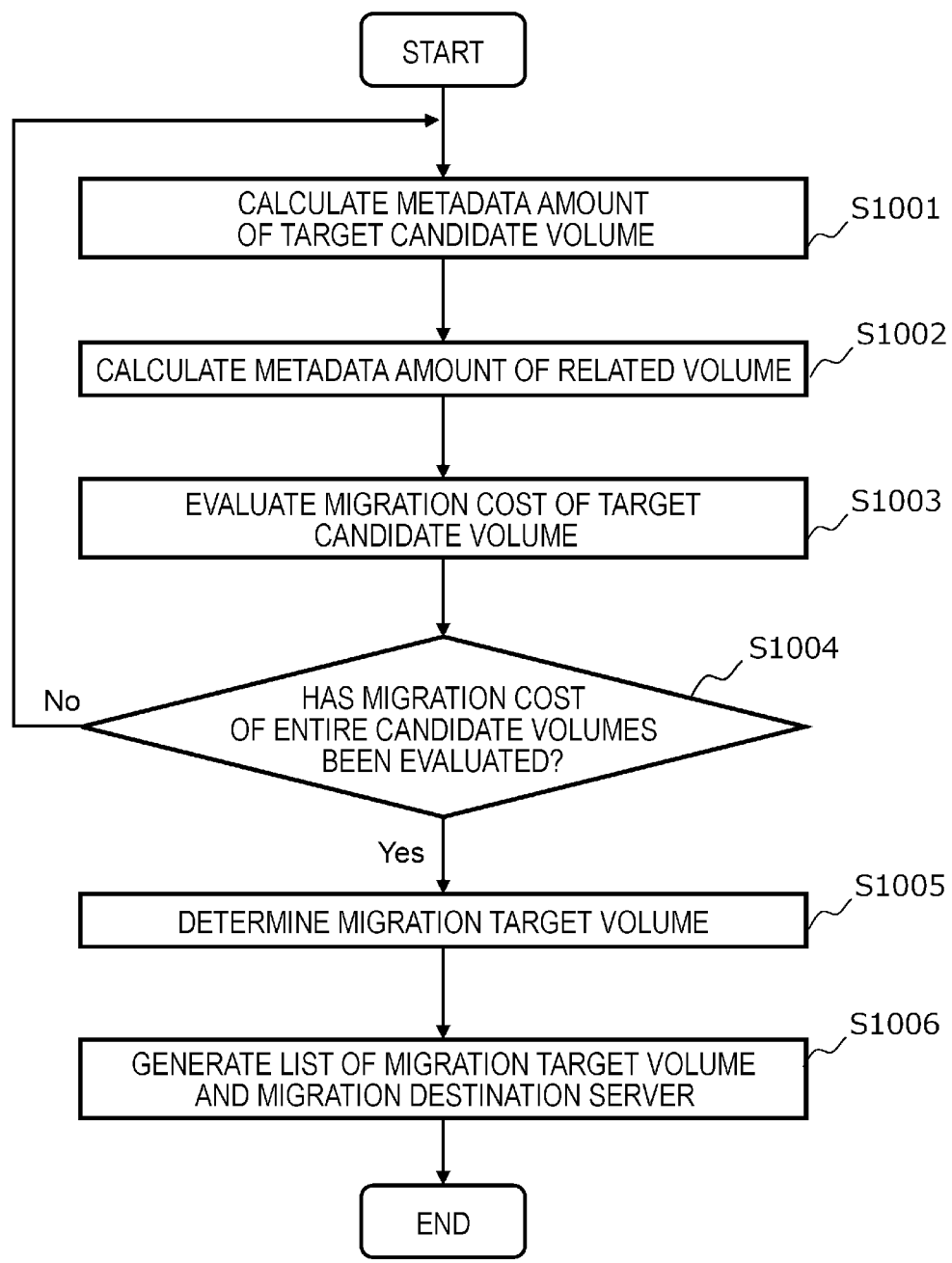
FIG. 26 is a flowchart for illustrating an example of a migration target volume selection process.

FIG. 26 is a flowchart for illustrating an example of the migration target volume selection process in step S802 of FIG. 24.

In the migration target volume selection process, first, the storage controller 26 selects one of the candidate volumes in which the migratable server candidate exists among the candidate volumes based on the evaluation result of the evaluation process of the migration destination server candidate and calculates the metadata amount, which is the data amount of metadata related to the target candidate volume (step S1001). In the evaluation process of the migration destination server candidate, the migratable server candidate is a server that has been evaluated as a migration destination server capable of meta-migration without metadata transfer, a migration destination server capable of meta-migration with metadata transfer, and a migration destination server capable of meta-migration.

The metadata related to the target candidate volume is management information necessary for managing the target candidate volume and is, for example, the volume information 110 of the target candidate volume and the block mapping information 111 corresponding to the (allocated) logical block of the target candidate volume. The metadata amount may be, for example, the data amount itself of metadata related to the target candidate volume, the number of block mapping information having the allocated logical block in the target candidate volume, the number of entries in the block mapping information of the allocated logical block in the target candidate volume, or the product of the data amount related to the target candidate volume per block mapping information 111 having the allocated logical block in the target candidate volume and the number of entries.

The storage controller 26 calculates the amount of related metadata, which is the metadata amount of the related volume, which is the volume 28 related to the target candidate volume (step S1002). The related volume is a volume that occurs when a data management function such as a deduplication function and a snapshot function is valid, and has a logical block that is mapped to the same physical block as the allocated logical block of the target candidate volume, for example. There may be a plurality of related volumes. Since it is more cost-effective during operation that the related volume is provided on the same server 20 as the server 20 that provides the target candidate volume, it is preferable to migrate to the same migration destination server together with the target candidate volume at the time of volume migration. The related metadata amount is the sum of the metadata amounts of respective related volumes. The method of calculating the metadata amount of the related volume is the same as the method of calculating the metadata amount of the target candidate volume.

The storage controller 26 evaluates the migration cost, which is a load related to the migration of the target candidate volume, based on the metadata amount of the target candidate volume and the related metadata amount of the related volume (step S1003). The migration cost is, for example, the sum of the metadata amount of the target candidate volume and the related metadata amount of the related volume.

Then, the storage controller 26 determines whether all the candidate volumes in which the migratable server candidates exist are selected (step S1004). If all the candidate volumes in which the migratable server candidates exist are not selected, the storage controller 26 returns to the process of step S1001 and selects a candidate volume in which a migratable server candidate that has not yet been selected exists.

If all the candidate volumes in which the migratable server candidates exist are selected, the storage controller 26 determines the candidate volume that executes migration as a migration target volume, based on the predetermined volume selection policy and the migration cost of each candidate volume (step S1005).

The volume selection policy is, for example, "to determine the candidate volume with the lowest migration cost as a migration target volume". Here, if there are a plurality of candidate volumes having the lowest migration cost, the storage controller 26 may determine each of the plurality of candidate volumes as a migration target volume or may determine one of the plurality of candidate volumes as a migration target volume. The volume selection policy may be, for example, "to determine a predetermined number of candidate volumes in order from the one with the lowest migration cost as migration target volumes" or may be "to determine candidate volumes with migration cost equal to or less than a threshold value as migration target volumes". The volume selection policy may be "to determine the migration target volume in order from the one with the lowest migration cost so that the load of the server 20 having the candidate volume (for example, the load of the CPU 24) is equal to or less than a threshold value". The volume selection policy may be "all candidate volumes in which migratable server candidates exist". Here, the calculation of the migration cost of the candidate volume can be omitted.

The storage controller 26 determines one of the migration destination server candidates of the migration target volumes for each migration target volume as a migration destination server based on the predetermined server selection policy, generates a list of combinations of the migration target volume and the migration destination server (step S1006), and ends the process.

In determining the migration destination server, the storage controller 26 sets the priorities of the migration destination server candidates from the highest priority to "a migration destination server capable of meta-migration without metadata transfer", "a migration destination server capable of meta-migration with metadata transfer", and "a migration destination server capable of data migration", and determines the migration destination server candidate with the highest priority as the migration destination server. If there are a plurality of migration destination server candidates having the same priority, the storage controller 26 determines one of the plurality of migration destination server candidates as the destination server. Here, the storage controller 26 may determine the migration destination server so that the migration destination servers of the different migration target volumes are as different as possible. The storage controller 26 may determine the migration destination server according to the resource status of each destination server.

Figure 27:
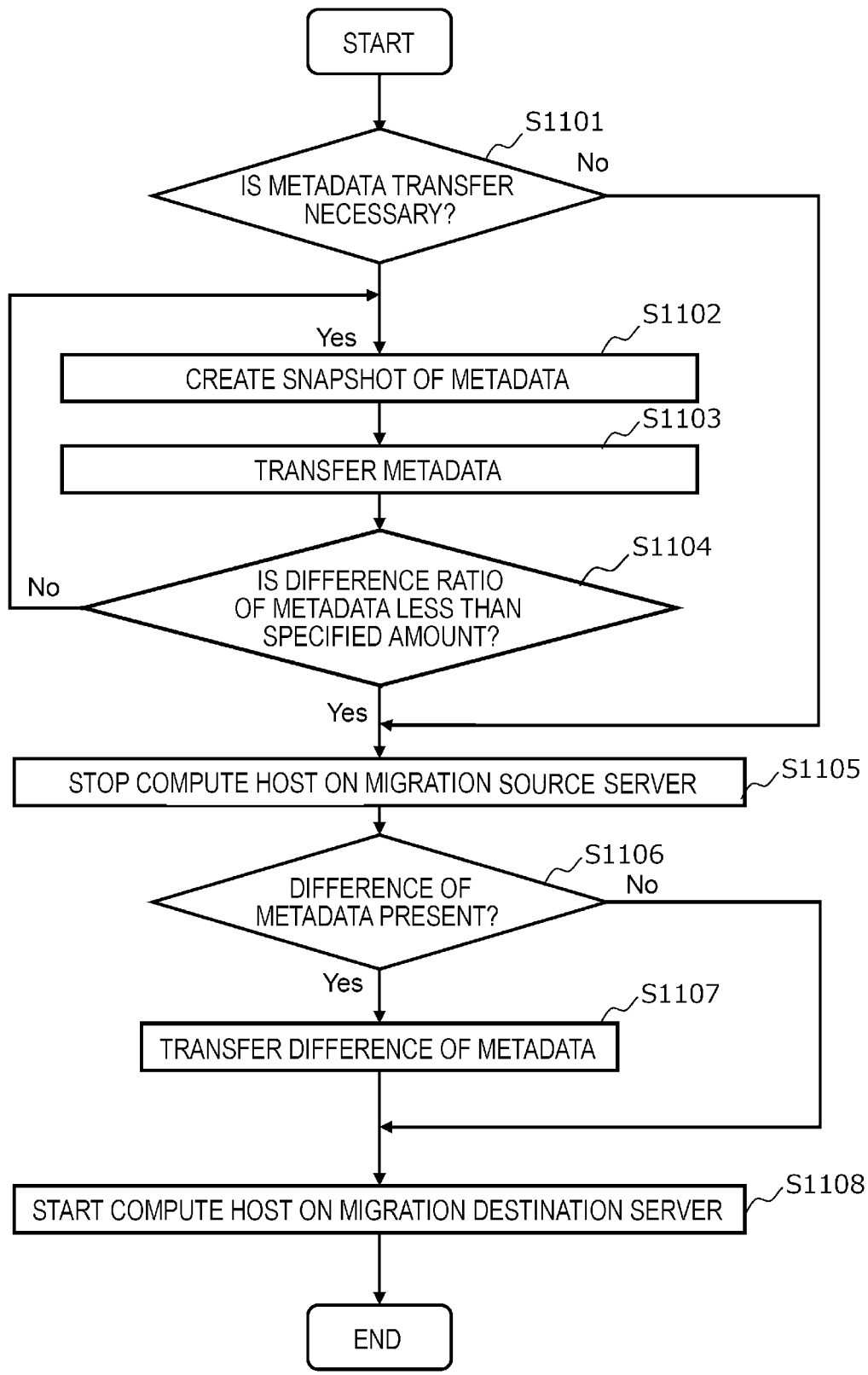
FIG. 27 is a flowchart for illustrating an example of a migration process of the compute host and the volume.

FIG. 27 is a flowchart for illustrating an example of the migration process in step S804 of FIG. 24. Hereinafter, as the migration process, an example of "the migration process of the compute host and the volume" in which both the volume 28 and the compute host 27 that receives the provided volume are migrated to the migration destination server will be described. The migration process of the compute host and the volume is performed when the migration destination server is capable of meta-migration without metadata transfer and meta-migration with metadata transfer. The description of data migration performed when the migration destination server is capable of data migration will be omitted.

The migration process of the compute host and the volume is performed by the storage controller 26 of the migration source server, which is the server 20 having the migration target volume, for each migration target volume. Specifically, first, the storage controller 26 determines whether it is necessary to transfer the metadata regarding the migration target volume (step S1101). Specifically, if the migration destination server corresponding to the migration target volume is capable of metadata migration without metadata transfer, the storage controller 26 determines that the metadata transfer is not necessary, and if the migration destination server corresponding to the migration target volume is capable of metadata migration with metadata transfer, the storage controller 26 determines that the metadata transfer is necessary.

When the metadata transfer is necessary, the storage controller 26 creates a snapshot of the metadata (step S1102). After that, the storage controller 26 transfers the snapshot as metadata to the migration destination server (step S1103). If the target candidate volume has a related volume, the storage controller 26 also creates and transfers a snapshot of the metadata of the related volume.

When the transfer is completed, the storage controller 26 determines whether the difference ratio, which is the ratio of the difference between the transferred snapshot and the stored metadata to the snapshot, is less than a specified amount (step S1104). Here, since the compute host 27 of the migration source server is not stopped, write processing occurs for the migration target volume during the snapshot transfer and the metadata is updated, and thus, a difference between the metadata and the snapshot may occur. The specified amount is, for example, 5%.

When the difference ratio is equal to or greater than the specified amount, the storage controller 26 returns to the process of step S1102. In step S1103, the storage controller 26 may transfer the data corresponding to the difference between the metadata and the snapshot thereof.

When it has been determined in step S1101 that the metadata transfer is not necessary, or when it has been determined in step S1104 that the difference is less than the specified amount, the storage controller 26 suspends the compute host 27 of the migration source server (step S1105).

The storage controller 26 determines whether there is a difference between the migration source metadata and the migration destination metadata (step S1106). When it has been determined in step S1101 that the metadata transfer is not necessary, the storage controller 26 determines that there is no difference in the metadata.

If there is a difference, the storage controller 26 transfers the difference (step S1107). If there is no difference, the storage controller 26 skips the process of step S1107.

Then, the storage controller 26 migrates the compute host 27 by starting the compute host 27 that receives the volume 28 provided according to the transferred metadata on the migration destination server (step S1108) and ends the process. In step S1108, the storage controller 26 passes the data necessary for starting the compute host 27 (such as the owner right of the volume 28 according to the transferred metadata) to the migration destination server.

If the compute host 27 cannot be migrated for some reason, only the volume 28 may be migrated. The compute host 27 on the migration source server may be stopped before the metadata is transferred. Here, the write processing for the migration target volume does not occur during the metadata transfer and it is not necessary to create a snapshot of the metadata.

As described above, according to the present embodiment, each server 20 stores metadata for managing the volume 28 having the logical block mapped to the physical block of the storage devices 11 and 21, and provides the compute host 27 with the volume 28 corresponding to the metadata. The computer system 1 calculates the metadata amount, which is the metadata amount of the volume 28, for each volume 28, determines the migration target volume from the volumes 28 based on each metadata amount and performs volume migration that transfers the server 20 providing the compute host 27 with the migration target volume to the migration destination server 20. Therefore, since the migration target volume is determined based on the metadata amount of the metadata of the volume 28, it is possible to reduce the migration load of migration.

In the present embodiment, the computer system 1 further performs volume migration to the related volume which is the volume 28 having the logical block mapped to the same physical block as the logical block having the migration target volume. In particular, here, the computer node that provides the compute host with the related volume is transferred to the migration destination computer node of the migration target volume. Therefore, since the migration target volume and the related volume can be managed by the same server 20, the load of the computer system 1 can be distributed more appropriately.

In the present embodiment, the computer system 1 calculates the related metadata amount, which is the data amount of the related volume of the volume, for each volume 28, and determines the migration target volume based on each metadata amount and each related metadata amount. Therefore, since the migration target volume is determined in consideration of the data amount of the related volume transferred together with the metadata of the migration target volume, it is possible to more appropriately reduce the migration load of migration.

In the present embodiment, the computer system 1 determines the migration destination server 20 based on the relationship between the migration source server 20 providing the migration target volume and each server 20. Therefore, migration to an appropriate migration destination becomes possible.

In the present embodiment, the computer system 1 determines the server that shares the storage device 11 or 21 with the migration source server 20 as the migration destination server. Therefore, since migration is possible without transferring data (data migration), the migration load of migration can be reduced more appropriately.

In the present embodiment, the storage device 11 is housed in the plurality of device boxes 2 connected to each of the plurality of servers 20 via the network 30. Therefore, since each server 20 can access the storage device 21 without going through another server 20, the load on the computer system 1 can be reduced.

In the present embodiment, in the computer system 1, if there is a server 20 that stores a replica of the metadata of the migration target volume among the computer nodes that share the storage device 11 or 21 with the migration source server, the server 20 is determined as the migration destination server. Therefore, since the replica can be used as the management information, the volume migration can be performed without transferring the management information, and the migration load of the migration can be reduced more appropriately.

The above-described embodiments of the present disclosure are examples for the purpose of explaining the present disclosure and the scope of the present disclosure is not intended to be limited only to those embodiments. One of ordinary skill in the art can implement the present disclosure in various other aspects without departing from the scope of the present disclosure.

What is claimed is:

1. A computer system including a plurality of computer nodes for executing read and write to a storage device having a plurality of physical storage areas, wherein
 each computer node of the plurality of computer nodes stores management information for managing a volume having a logical storage area mapped to a physical storage area of the storage device, and provides a compute host with a volume managed by a computer node of the plurality of computer nodes according to the management information such that the compute host is provided with a plurality of volumes,
 the computer system configured to:
  calculate a plurality of metadata amounts, wherein for each volume of the plurality of volumes, the computer system calculates a metadata amount, which is a data amount of management information for managing a volume managed by a computer node of the plurality of computer nodes,
  determine, from the plurality of volumes, a migration target volume, which is a volume of the plurality of volumes, based on the plurality of metadata amounts, and
  perform volume migration that transfers a computer node that provides the compute host with the migration target volume to a migration destination computer node, wherein the computer system determines the migration destination computer node based on a relationship between each computer node of the plurality of computer nodes and a migration source computer node, wherein the migration source computer node is a computer node of the plurality of computer nodes that provides the compute host with the migration target volume,
  wherein if a certain computer node stores a replica of management information of the migration target volume among computer nodes sharing the storage device with a migration source computer node, the computer system determines that certain computer node as the migration destination computer node.

2. The computer system according to claim 1, wherein the computer system further performs volume migration for a related volume, which is a volume of the plurality of volumes, wherein a logical storage area of the related volume and a logical storage area of the migration target volume map to a same physical storage area of the plurality of physical storage areas.

3. The computer system according to claim 2, wherein the computer system calculates a plurality of related metadata amounts, wherein for each volume of the plurality of volumes, the computer system calculates a related metadata amount, which is a data amount of a related volume of a volume, and determines the migration target volume based on the plurality of metadata amounts and the plurality of related metadata amounts.

4. The computer system according to claim 2, wherein the computer system transfers a computer node that provides the compute host with the related volume of the migration target volume to the migration destination computer node.

5. The computer system according to claim 4, wherein the storage device is shared by the plurality of computer nodes, and the computer system determines a computer node that shares the storage device with the migration source computer node as the migration destination computer node.

6. The computer system according to claim 1, wherein the storage device is housed in each of a plurality of device boxes connected to the plurality of computer nodes via a network.

7. A load distribution method by a computer system that includes a plurality of computer nodes for executing read and write to a storage device having a plurality of physical storage areas, wherein each computer node of the plurality of computer nodes stores management information for managing a volume having a logical storage area mapped to a physical storage area of the storage device and provides a compute host with a volume managed by a computer node of the plurality of computer nodes according to the management information such that the compute host is provided with a plurality of volumes, the method comprising:
 calculating a plurality of metadata amounts, wherein for each volume of the plurality of volumes, the computer system calculates a metadata amount, which is a data amount of management information for managing a volume managed by a computer node of the plurality of computer nodes;
 determining, from the plurality of volumes, a migration target volume, which is a volume of the plurality of volumes, based on the plurality of metadata amounts;
 determining a migration destination computer node based on a relationship between each computer node of the plurality of computer nodes and a migration source computer node, wherein the migration source computer node is a computer node of the plurality of computer nodes that provides the compute host with the migration target volume; and performing volume migration that transfers a computer node that provides the compute host with the migration target volume to the migration destination computer node, wherein if a certain computer node stores a replica of management information of the migration target volume among computer nodes sharing the storage device with a migration source computer node, the computer system determines that certain computer node as the migration destination computer node.

* * * * *